US012731818B2

(12) United States Patent
Kim et al.

(10) Patent No.: US 12,731,818 B2
(45) Date of Patent: Sep. 8, 2026

(54) ELECTRODE ASSEMBLY AND LITHIUM SECONDARY BATTERY INCLUDING THE SAME

(71) Applicant: LG Energy Solution, Ltd., Seoul (KR)

(72) Inventors: Nam Hun Kim, Daejeon (KR); Seong Wook Kim, Daejeon (KR); Jae Min Kim, Daejeon (KR); Chang Ho Kim, Daejeon (KR); Kyoung Ha Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 19/337,655

(22) Filed: Sep. 23, 2025

(65) Prior Publication Data

US 2026/0018681 A1 Jan. 15, 2026

Related U.S. Application Data

(63) Continuation of application No. PCT/KR2024/015438, filed on Oct. 11, 2024.

(30) Foreign Application Priority Data

Oct. 13, 2023 (KR) ........................ 10-2023-0137204
Oct. 11, 2024 (KR) ........................ 10-2024-0138669

(51) Int. Cl.
*H01M 10/0587* (2010.01)
*H01M 10/052* (2010.01)
*H01M 50/105* (2021.01)

(52) U.S. Cl.
CPC ..... *H01M 10/0587* (2013.01); *H01M 10/052* (2013.01); *H01M 50/105* (2021.01)

(58) Field of Classification Search
CPC ........... H01M 10/0587; H01M 10/052; H01M 50/105
See application file for complete search history.

(56) References Cited

U.S. PATENT DOCUMENTS 8,283,064 B2 * 10/2012 Kim .................. H01M 10/0587 429/138
2015/0132658 A1 5/2015 Miyake et al.
(Continued)

FOREIGN PATENT DOCUMENTS

EP 2426773 A2 * 3/2012 .............. H01M 4/13
EP 4174995 A1 5/2023
(Continued)

*Primary Examiner* — Helen Oi K Conley
(74) *Attorney, Agent, or Firm* — BRYAN CAVE LEIGHTON PAISNER LLP

(57) ABSTRACT

An electrode assembly including an electrode stack, which includes a positive electrode including a positive electrode active material layer; a negative electrode including a negative electrode active material layer; and a separator disposed between the positive electrode and the negative electrode, and at least one fixing member which fixes the electrode stack by winding the electrode stack in an overall width direction, wherein the positive electrode includes a positive electrode sliding portion in which a thickness of the positive electrode active material layer decreases, the fixing member includes a first fixing member overlapping the positive electrode sliding portion and a second fixing member not overlapping the positive electrode sliding portion, and a thickness of the first fixing member is greater than a thickness of the second fixing member.

16 Claims, 5 Drawing Sheets

(56) References Cited

U.S. PATENT DOCUMENTS

| | | | |
|---|---|---|---|
| 2016/0043358 | A1 | 2/2016 | Joo |
| 2024/0097178 | A1 | 3/2024 | Cho |
| 2024/0145830 | A1 | 5/2024 | Na et al. |

FOREIGN PATENT DOCUMENTS

| | | | | | |
|---|---|---|---|---|---|
| JP | 11-144762 | | * | 5/1999 | ............ H01M 10/40 |
| JP | 2003257495 | | * | 9/2003 | ............ H01M 10/40 |
| JP | 2003257495 | A | * | 9/2003 | ............ H01M 10/40 |
| JP | 2016207286 | A | | 12/2016 | |
| JP | 2019102167 | A | | 6/2019 | |
| KR | 101182933 | B1 | | 9/2012 | |
| KR | 20140114688 | A | | 9/2014 | |
| KR | 20160018170 | A | | 2/2016 | |
| KR | 101831484 | B1 | | 2/2018 | |
| KR | 10-2101046 | B1 | | 4/2020 | |
| KR | 102142673 | B1 | | 8/2020 | |
| KR | 20210024844 | A | | 3/2021 | |
| KR | 20230060119 | A | | 5/2023 | |
| KR | 20230109941 | A | | 7/2023 | |
| WO | 2023075326 | A1 | | 5/2023 | |

* cited by examiner

ELECTRODE ASSEMBLY AND LITHIUM SECONDARY BATTERY INCLUDING THE SAME

REFERENCE TO RELATED APPLICATIONS

The present application is a Continuation of International Application No. PCT/KR2024/015438 filed on Oct. 11, 2024, and claims priority to and the benefit of Korean Patent Application Nos. 10-2023-0137204, filed on Oct. 13, 2023, and 10-2024-0138669, filed on Oct. 11, 2024, the disclosures of which are incorporated by reference herein in their entirety.

TECHNICAL FIELD

The present invention relates to an electrode assembly and a lithium secondary battery including the same, and more particularly, to an electrode assembly, in which a uniform pressure may be transmitted to an end portion when inserted into a module, and a lithium secondary battery including the same.

BACKGROUND ART

With the advancement of technology in electric vehicles, energy storage systems (ESS), and portable electronic devices, demand for lithium secondary batteries as an energy source has been rapidly increasing.

The lithium secondary batteries are classified as pouch type, a can type, and the like, according to a material of a case for accommodating an electrode assembly, and the electrode assembly may be classified into a jelly-roll type, a stacked type, a stack and lamination type, or a stack and folding type, according to preparation method and shape thereof.

Among them, the pouch type secondary battery is prepared by a method of forming a cup portion by press working a flexible pouch film laminate, accommodating the electrode assembly in the cup portion, and sealing a sealing portion after injecting an electrolyte. The can type secondary battery is prepared by a method of accommodating the electrode assembly in a can formed of a metallic material, injecting the electrolyte, and then assembling a top cap on an upper portion of the can to seal the can.

The electrode assembly is a structure including a positive electrode, a negative electrode, and a separator disposed between the positive electrode and the negative electrode, wherein the positive electrode and the negative electrode each are prepared by forming an active material layer by coating a current collector with an electrode slurry, and then drying and rolling the coated current collector. In a case in which the electrode is prepared by coating with the electrode slurry, a sliding portion is formed in which a thickness of the active material layer is gradually decreased at an end portion of the active material layer. In a region where the electrode sliding portion is formed, since a distance between the positive electrode active material layer and the negative electrode active material layer increases and adhesion to the separator decreases, lithium plating (Li-plating) may easily occur.

Also, a cell thickness at an end portion of the electrode assembly is relatively decreased due to the sliding portion, wherein, in a case in which many cells are stacked to form a module, a thickness difference between a center portion and an end portion of the cell is increased, and, as a result, since less pressure is applied to the end portion of the cell in the module, occurrence of swelling and the lithium plating may be further increased.

Furthermore, since the electrolyte is consumed as the lithium secondary battery is repeatedly charged and discharged, an amount of the electrolyte decreases, wherein, if the amount of the electrolyte in the battery decreases, the electrolyte may not reach an electrode end portion to reduce electrolyte impregnability, and as a result, mobility of lithium ions may be decreased to cause the lithium plating (Li-plating).

Recently, as the lithium secondary batteries are being used as a power source for electric vehicles, a lithium secondary battery with a long overall length relative to an overall width (hereinafter, referred to as a 'long cell' for convenience) is being developed in consideration of battery accommodation space and location. The lithium secondary battery having such a long cell structure is advantageous in that it may achieve higher capacity than a conventional lithium secondary battery, and has excellent space efficiency. However, there is a problem in that a pressure at an end portion of an electrode assembly close to an electrode tab decreases as charge and discharge are repeated so that adhesion between a separator and an electrode is reduced, and as a result, the lithium plating is further intensified.

The lithium plating is a phenomenon in which lithium moved from the positive electrode is not intercalated into the negative electrode, but is precipitated on a surface of the negative electrode, wherein, if the lithium plating occurs, the corresponding portion turns gray. Lithium plating may not only degrade battery performance and significantly degrade long-term life characteristics, but may also limit fast charging capacity of the battery and result in combustion or explosion.

SUMMARY OF THE INVENTION

An aspect of the present invention provides an electrode assembly which is developed to enable uniform transmission of pressure to the entire electrode assembly when inserted into a module by disposing a thicker fixing member in a region overlapping a positive electrode sliding portion to compensate for a decrease in thickness at an end portion of a cell, and to enable suppression of swelling and lithium plating by improving adhesion between an electrode and a separator.

Another aspect of the present invention provides a lithium secondary battery in which degradation of battery performance and safety due to lithium precipitation may be prevented by including the above electrode assembly.

According to an embodiment, the present invention provides an electrode assembly including an electrode stack, which includes a positive electrode including a positive electrode active material layer; a negative electrode including a negative electrode active material layer; and a separator disposed between the positive electrode and the negative electrode, and at least one fixing member which fixes the electrode stack by winding the electrode stack in an overall width direction.

In this case, the positive electrode includes a positive electrode sliding portion in which a thickness of the positive electrode active material layer decreases.

Also, the fixing member includes a first fixing member overlapping the positive electrode sliding portion and a second fixing member not overlapping the sliding portion, and a thickness of the first fixing member is greater than a thickness of the second fixing member.

Preferably, when the thickness of the first fixing member is $T_1$, the thickness of the second fixing member is $T_2$, and a thickness of the positive electrode is $T_c$, the electrode assembly satisfies Equation 1.

$$0 < T_1 - T_2 \leq 0.5T_c \quad \text{Equation 1}$$

The negative electrode may include a negative electrode sliding portion in which a thickness of the negative electrode active material layer decreases, and the fixing member may overlap at least a portion of a region corresponding to the negative electrode sliding portion.

A ratio (L/W) of an overall length (L) to an overall width (W) of the electrode stack may be 3 or more, and the ratio of the overall length (L) to the overall width (W) of the electrode stack may preferably be 3 to 7.

The electrode assembly according to the present invention may include 2 to 10 fixing members, wherein, in this case, the fixing members may be arranged at horizontally symmetrical positions in an overall length direction, and preferably, the fixing members are arranged apart from each other at equal intervals.

The fixing member may include a porous structure, and may specifically be a tape in which an adhesive layer is formed on one surface of a base material having a porous structure.

The fixing member may have a width of 10 mm to 50 mm.

According to another embodiment, the present invention provides a lithium secondary battery including the electrode assembly according to the present invention; an electrolyte; and a battery case accommodating the electrode assembly and the electrolyte. In this case, the battery case may be a pouch type battery case.

In an electrode assembly according to the present invention, since a first fixing member is disposed in overlap a region where a positive electrode sliding portion is formed such that a close contact between the electrode sliding portion and a separator is firmly maintained and, accordingly, a decrease in lithium mobility due to poor interfacial adhesion between the electrode sliding portion and the separator may be minimized, and the electrode assembly according to the present invention may prevent precipitation of lithium from the electrode sliding portion.

Also, since a decrease in thickness at an end portion of the electrode assembly is compensated by making the first fixing member, which is disposed in the region overlapping the positive electrode sliding portion, thicker than a second fixing member, pressure may be uniformly transmitted to the entire electrode assembly when inserted into a module, and accordingly, occurrence of swelling and lithium plating due to a decrease in pressure at an end portion of a cell may be suppressed.

Furthermore, in a case in which the fixing member is disposed as in the present invention in a long cell with a long overall length relative to an overall width, since a phenomenon of reduction of electrolyte solution in the electrode sliding portion may be minimized, degradation of battery performance may be prevented.

Thus, if the electrode assembly according to the present invention is used, excellent performance and safety may be achieved until lifetime of a lithium secondary battery ends.

DETAILED DESCRIPTION

Figure 1:
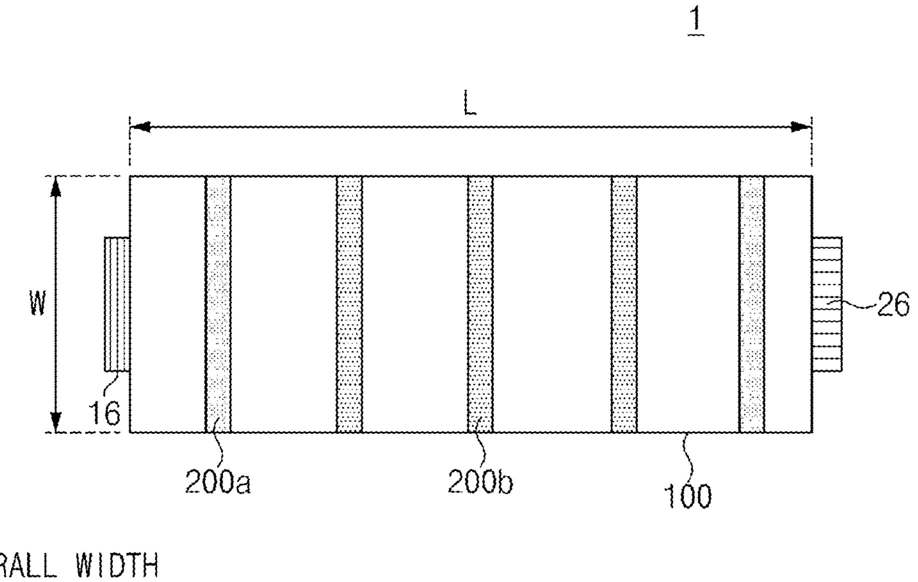
FIG. 1 is a top view of an electrode assembly according to an embodiment of the present invention.

Hereinafter, the present invention will be described in detail.

As a result of a significant amount of research conducted into developing a lithium secondary battery capable of achieving excellent performance and safety until the end of lifetime of the battery, the present inventors have found that interfacial adhesion between an electrode sliding portion and a separator may not only be improved by fixing a region corresponding to a positive electrode sliding portion with a thick fixing member during formation of an electrode assembly, but also a pressure may be relatively uniformly transmitted to an entire cell after assembly of a module. Accordingly, degradation of battery performance may be minimized until the end of the lifetime of the battery and excellent safety may be achieved by suppressing ignition and/or explosion due to lithium plating, thereby leading to the completion of the present invention.

Specifically, an electrode assembly according to the present invention is characterized in that it includes an electrode stack including a positive electrode, a negative electrode, and a separator, and at least one fixing member which fixes an outer surface of the electrode stack by winding the outer surface of the electrode stack in an overall width direction, wherein the positive electrode includes a positive electrode sliding portion in which a thickness of a positive electrode active material layer decreases, the fixing member includes a first fixing member disposed to overlap a region corresponding to the positive electrode sliding portion and a second fixing member disposed in a region not corresponding to the positive electrode sliding portion, and a thickness of the first fixing member is greater than a thickness of the second fixing member.

In a case in which the thickness of the first fixing member disposed in the region overlapping the positive electrode sliding portion is greater than the thickness of the second fixing member disposed in another region as in the present invention, a decrease in thickness of an end portion of the cell may be compensated by the thickness of the first fixing member. Thus, swelling and lithium precipitation, which occur due to the decrease in thickness of the end portion of the cell during the assembly of the module, may be minimized.

Also, in a case in which the first fixing member is disposed to overlap the positive electrode sliding portion region as in the present invention, a distance between the electrode sliding portion and the separator is maintained by the first fixing member, and an increase in the distance between the electrode sliding portion and the separator is prevented by the first fixing member even if charge and discharge are repeated to cause a change in volume of the positive electrode active material layer and/or a negative electrode active material layer. Accordingly, since interfacial adhesion between the separator and the electrode at an end portion of the electrode assembly and electrolyte solution impregnability may be maintained, even if charge and discharge are repeated, occurrence of lithium plating due to a decrease in lithium mobility may be suppressed.

Figure 2:
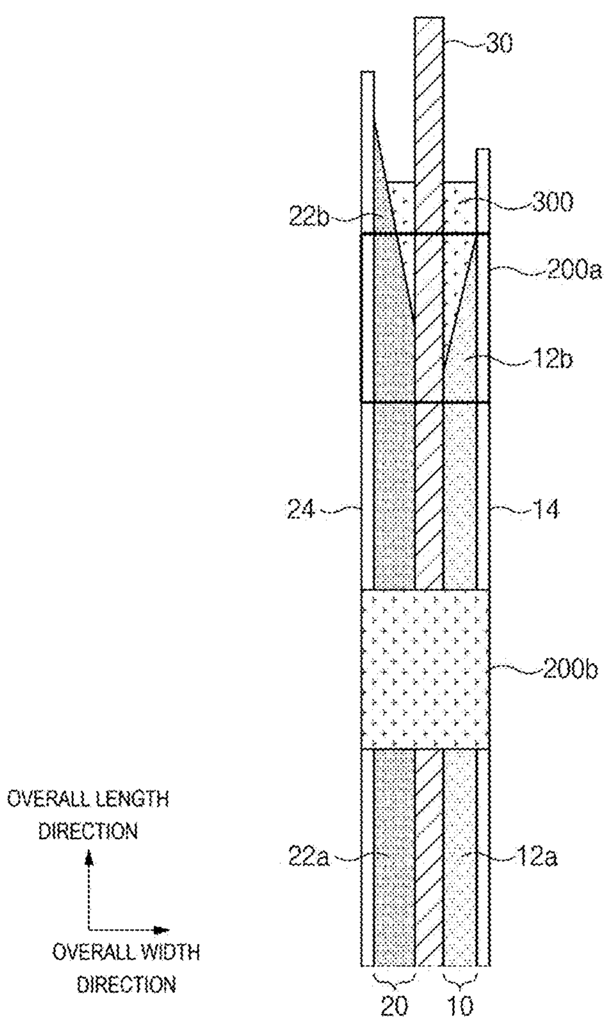
FIG. 2 is a cross-sectional view of an electrode stack according to an embodiment of the present invention.

FIG. 1 illustrates a top view of an electrode assembly 1 according to an embodiment of the present invention, and FIG. 2 illustrates a cross-sectional view of an electrode stack according to an embodiment of the present invention. Hereinafter, the present invention will be described in more detail with reference to the drawings. However, the following drawings are presented for purposes of explanation only, the scope of the present invention is not limited thereto, and various modifications are possible without departing from the purpose and spirit of the present invention.

As illustrated in FIG. 1, an electrode assembly 1 according to the present invention includes an electrode stack 100 and one or more fixing members 200*a* and 200*b* which fix the electrode stack 100 formed by winding the electrode stack in an overall width direction, wherein the fixing members 200*a* and 200*b* include a first fixing member 200*a* overlapping a positive electrode sliding portion 12*b* and a second fixing member 200*b* not overlapping the positive electrode sliding portion 12*b*.

Referring to FIG. 2, the electrode stack 100 includes a positive electrode 10 including positive electrode active material layers 12*a* and 12*b*, a negative electrode 20 including negative electrode active material layers 22*a* and 22*b*, and a separator 30 disposed between the positive electrode 10 and the negative electrode 20. The electrode stack 100 may be a stacked type electrode stack which is formed by cutting the positive electrode, the separator, and the negative electrode to a certain size and then stacking them.

The positive electrode 10, for example, may be formed in a structure in which the positive electrode active material layers 12*a* and 12*b* are formed on one surface or both surfaces of a positive electrode collector 14, wherein the positive electrode active material layers include a positive electrode central portion 12*a* in which a thickness of the positive electrode active material layer is maintained relatively constant, and a positive electrode sliding portion 12*b* in which the thickness of the positive electrode active material layer decreases. Also, the positive electrode 10 includes a positive electrode tab 16 for electrical connection to an external power source.

The positive electrode 10 of a lithium secondary battery is prepared by a method of applying a positive electrode slurry, which is prepared by dispersing a positive electrode active material, a conductive agent, and a binder in a solvent such as dimethyl sulfoxide (DMSO), isopropyl alcohol, N-methylpyrrolidone (NMP), acetone, or water, onto one surface or both surfaces of the positive electrode collector 14, removing the solvent of the positive electrode slurry through a drying process, and then rolling. In a case in which the positive electrode active material layer is formed by a wet coating method as described above, a coating amount of the positive electrode slurry at an end portion of the positive electrode active material layer is reduced to form the positive electrode sliding portion 12*b*.

As the positive electrode collector 14, various positive electrode collectors used in the art may be used. For example, as the positive electrode collector, stainless steel, aluminum, nickel, titanium, fired carbon, or aluminum or stainless steel that is surface-treated with one of carbon, nickel, titanium, silver, or the like may be used. The positive electrode collector may typically have a thickness of 3 μm to 500 μm, and microscopic irregularities may be formed on the surface of the collector to improve adhesion of the positive electrode active material. The positive electrode collector, for example, may be used in various shapes such as that of a film, a sheet, a foil, a net, a porous body, a foam body, a non-woven fabric body, and the like.

The positive electrode active material layers 12*a* and 12*b* may include a positive electrode active material, a conductive agent, and a binder.

The positive electrode active material is a compound capable of reversibly intercalating and deintercalating lithium, wherein various positive electrode active materials used in the art may be used, and a type thereof is not particularly limited. For example, lithium iron phosphate-based oxide (e.g., $LiFe_{1-x}M_xPO_4$, $0 \leq x < 1$), lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$)), lithium-nickel-cobalt-based oxide (e.g., $LiNi_{1-Y1}Co_{Y1}O_2$ (where $0<Y1<1$)), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$)), lithium-nickel-manganese-cobalt-based oxide (e.g., $Li(Ni_{p1}Co_{q1}Mn_{r1})O_2$ (where $0<p1<1$, $0<q1<1$, $0<r1<1$, and $p1+q1+r1=1$) or $Li(Ni_{p2}CO_{q2}Mn_{r2})O_4$ (where $0<p2<2$, $0<q2<2$, $0<r2<2$, and $p2+q2+r2=2$), or lithium-nickel-cobalt-transition metal (M) oxide (e.g., $Li(Ni_{p3}Co_{q3}Mn_{r3}Ms_3)O_2$ (where M is selected from the group consisting of aluminum (Al), iron (Fe), vanadium (V), chromium (Cr), titanium (Ti), tantalum (Ta), magnesium (Mg), and molybdenum (Mo), and p3, q3, r3, and s3 are atomic fractions of each independent elements, wherein $0<p3<1$, $0<q3<1$, $0<r3<1$, $0<s3<1$, and $p2+q2+r3+s2=1$)) or a combination thereof may be used as the positive electrode active material.

The positive electrode active material may be included in an amount of 80 wt % to 99 wt %, preferably 85 wt % to 99 wt %, and more preferably 90 wt % to 99 wt %, based on a total weight of the positive electrode active material layer.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon-based materials such as carbon black, acetylene black, Ketjen black, channel black, furnace black, lamp black, thermal black, carbon fibers, and carbon nanotubes; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt %, preferably 1 wt % to 20 wt %, and more preferably 1 wt % to 10 wt %, based on the total weight of the positive electrode active material layer.

The binder improves adhesion between positive electrode active material particles and adhesion between the positive electrode active material and the positive electrode collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer rubber (EPDM rubber), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt %, preferably 1 wt % to 20 wt %, and more preferably 1 wt % to 10 wt %, based on the total weight of the positive electrode active material layer.

The negative electrode 20 may be formed in a structure in which the negative electrode active material layers 22*a* and 22*b* are formed on one surface or both surfaces of a negative electrode collector 24, wherein the negative electrode active material layers include a negative electrode central portion 22*a* in which a thickness of the negative electrode active material layer is maintained relatively constant, and a negative electrode sliding portion 22*b* in which the thickness of the negative electrode active material layer decreases. Also, the negative electrode 20 includes a negative electrode tab 26 for electrical connection to an external power source.

The negative electrode 20 of the lithium secondary battery is prepared by a method of applying a negative electrode slurry, which is prepared by dispersing a negative electrode active material, a conductive agent, and a binder in a solvent such as dimethyl sulfoxide (DMSO), isopropyl alcohol, N-methylpyrrolidone (NMP), acetone, or water, onto one surface or both surfaces of the negative electrode collector 24, removing the solvent of the negative electrode slurry through a drying process, and then rolling, wherein, in a case in which the negative electrode active material layer is formed by a wet coating method as described above, a coating amount of the negative electrode slurry at an end portion of the negative electrode active material layer is reduced to form the negative electrode sliding portion 22*b*. Although it varies depending on a negative electrode loading amount and coating conditions, the negative electrode sliding portion 22*b* is generally formed to be longer than the positive electrode sliding portion 12*b*.

As the negative electrode collector, negative electrode collectors commonly used in the art may be used, and, for example, copper, stainless steel, aluminum, nickel, titanium, fired carbon, copper or stainless steel that is surface-treated with one of carbon, nickel, titanium, silver, or the like, and an aluminum-cadmium alloy may be used. The negative electrode collector may typically have a thickness of 3 μm to 500 μm, and, similar to the positive electrode collector, microscopic irregularities may be formed on the surface of the collector to improve adhesion of the negative electrode active material. The negative electrode collector, for example, may be used in various shapes such as that of a film, a sheet, a foil, a net, a porous body, a foam body, a non-woven fabric body, and the like.

The negative electrode active material layer may include a negative electrode active material, a conductive agent, and a binder.

As the negative electrode active material, compounds capable of reversibly intercalating and deintercalating lithium, which are commonly used in the art, may be used, and a type thereof is not particularly limited. Specific examples of the negative electrode active material may be a carbonaceous material such as artificial graphite, natural graphite, graphitized carbon fibers, and amorphous carbon; a silicon-based material such as silicon (Si), a Si—Me alloy (where, Me is at least one selected from the group consisting of aluminum (Al), tin (Sn), magnesium (Mg), copper (Cu), iron (Fe), lead (Pb), zinc (Zn), manganese (Mn), chromium (Cr), titanium (Ti), and nickel (Ni)), $SiO_y$ (where, $0<y<2$), and a Si—C composite; a lithium metal thin film; and a metallic material alloyable with lithium such as Sn and Al, and any one thereof or a mixture of two or more thereof may be used.

The negative electrode active material may be included in an amount of 80 wt % to 99 wt %, preferably 85 wt % to 99 wt %, and more preferably 90 wt % to 99 wt %, based on a total weight of the negative electrode active material layer.

The conductive agent is used to provide conductivity to the negative electrode, wherein any conductive agent may be used without particular limitation as long as it has suitable electron conductivity without causing chemical changes in the battery. Specific examples of the conductive agent may be graphite such as natural graphite or artificial graphite; carbon-based materials such as carbon black, acetylene black, Ketjen black, channel black, furnace black, lamp black, thermal black, carbon fibers, and carbon nanotubes; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt %, preferably 1 wt % to 20 wt %, and more preferably 1 wt % to 10 wt %, based on the total weight of the negative electrode active material layer.

The binder improves adhesion between negative electrode active material particles and adhesion between the negative electrode active material and the negative electrode collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer rubber (EPDM rubber), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt %, preferably 1 wt % to 20 wt %, and more preferably 1 wt % to 10 wt %, based on the total weight of the negative electrode active material layer.

Next, the separator 30 separates the negative electrode and the positive electrode and provides a movement path of lithium ions, wherein any separator may be used as the separator without particular limitation as long as it is typically used in a lithium secondary battery. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used as the separator. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength.

As in the present invention, in a case in which the electrode sliding portion, in which the thickness of the active material layer decreases, is included at ends of the positive electrode and the negative electrode, since the separator and the electrode active material layer are not closely attached to each other in the electrode sliding portion, lithium mobility is lower than that of the central portion of the electrode, and, as a result, a lithium plating phenomenon occurs in which lithium ions generated in the positive electrode during a discharge process are not intercalated into the negative electrode and are precipitated on a surface of the negative electrode. Also, in a case in which an overall length of the electrode assembly increases, a pressure at an end of the electrode assembly is decreased to further decrease adhesion to the separator at the end of the electrode assembly, and in a case in which charge and discharge are repeated to consume the electrolyte, since the electrolyte may not be in contact with the electrode sliding portion, the degradation of battery performance and the lithium plating phenomenon may be accelerated.

Furthermore, in a case in which a plurality of cells are stacked and assembled into a module, since a difference in thickness between the end portion and the central portion of the cell is accumulated and further increased, the pressure is not properly transmitted to the end portion of the cell, and thus, lithium precipitation is further intensified.

The present invention aims to solve such a problem, wherein, since the first fixing member 200*a* is disposed to overlap the positive electrode sliding portion 12*b* and the thickness of the first fixing member 200*a* is made greater than the thickness of the second fixing member 200*b* disposed in a region that does not overlap the positive electrode sliding portion 12*b*. The adhesion between the positive electrode sliding portion 12*b* and the separator 30 is improved to thereby minimize the decrease in lithium mobility due to poor interfacial adhesion between the electrode sliding portion and the separator, and the decrease in thickness of the end portion of the cell during the assembly of the module is compensated, to enable the pressure to be relatively uniformly transmitted to the entire electrode assembly in the module, and thus, the swelling and the lithium precipitation may be minimized.

In this case, it is desirable that a difference between a thickness $T_1$ of the first fixing member and a thickness $T_2$ of the second fixing member, i.e., $T_1-T_2$ satisfies Equation 1 below.

$$0 < T_1 - T_2 \leq 0.5T_c \quad \text{Equation 1}$$

In Equation 1, $T_1$ is the thickness of the first fixing member, $T_2$ is the thickness of the second fixing member, and $T_c$ is a thickness of the positive electrode.

In a case in which $T_1-T_2$ is 0 or less, there is no effect on the decrease in thickness of the end portion of the cell relative to the central portion of the cell, or the decrease in thickness may rather be increased to intensify the lithium plating, and, in a case in which $T_1-T_2$ is greater than 0.5 $T_c$, since a thickness of a portion of the cell corresponding to the sliding portion becomes greater than the thickness of the central portion of the cell to increase pressure on outside of a module frame during cycles, fracture of the frame may occur due to non-uniform pressurization. $T_1-T_2$ may preferably be 0.01 $T_c$ to 0.5 $T_c$, more preferably, 0.2 $T_c$ to 0.3 $T_c$.

Specifically, the thickness $T_1$ of the first fixing member may be 0.2 to 0.5 times, preferably 0.25 to 0.45 times, and more preferably 0.3 to 0.4 times, the thickness $T_c$ of the positive electrode. The thickness $T_2$ of the second fixing member may be 0.05 to 0.2 times, preferably 0.1 to 0.15 times, and more preferably 0.12 to 0.14 times, the thickness $T_c$ of the positive electrode. In a case in which the thicknesses of the first fixing member and the second fixing member satisfy the above ranges, the decrease in thickness of the end portion of the cell is appropriately compensated so that the pressure may be transmitted relatively uniformly to the entire electrode assembly in the module.

The thickness $T_c$ of the positive electrode may vary depending on capacity of a battery to be finally prepared, but, for example, may be 100 μm to 200 μm, 120 μm to 180 μm, or 140 μm to 160 μm. In this case, the thickness of the positive electrode means a thickness after rolling. If the thickness of the positive electrode is excessively high, energy density of the battery may be reduced, and if the thickness of the positive electrode is excessively low, coating processability of the positive electrode active material layer is reduced, the positive electrode active material may be significantly broken during electrode rolling, and, as a result, a side reaction with the electrolyte solution is increased to increase a gas generation amount so that life characteristics may be degraded.

The first fixing member 200*a* may be disposed to overlap at least a portion of a region corresponding to the negative electrode sliding portion 22*b*. In a case in which the first fixing member 200*a* is disposed to overlap at least portion of the negative electrode sliding portion, since both the interfacial adhesion between the positive electrode and the separator and the interfacial adhesion between the negative electrode and the separator increase, an effect of suppressing the lithium plating and performance degradation may be further improved.

A ratio (L/W) of an overall length L to an overall width W of the electrode stack may be 3 or more, and the ratio of the overall length L to the overall width W of the electrode stack may preferably be 3 to 7, more preferably, 4 to 6. In this case, the overall width and the overall length mean a length in a width direction and a length in a length direction of a component having the largest dimension among the positive electrode, the negative electrode, and the separator which constitute the electrode stack, respectively. In a case in which the ratio of the overall length to the overall width of the electrode stack is 3 or more, there is an advantage of being able to achieve high capacity. However, in a case in which the overall length relative to the overall width is formed large as described above, since cell pressure at the end portion in an overall length direction may be decreased, a problem may occur in which electrolyte impregnability at the end portion may be reduced when the electrolyte is consumed due to charge and discharge. However, in the case that the first fixing member is disposed to overlap the positive electrode sliding portion as in the present invention, this problem may be solved because the pressure is maintained relatively uniformly up to the end of the electrode stack.

Specifically, the electrode stack according to the present invention may have an overall width of 50 mm to 200 mm, preferably 70 mm to 200 mm, and more preferably 70 mm to 150 mm, and may have an overall length of 200 mm to 1,000 mm, preferably 300 mm to 800 mm, and more preferably 400 mm to 600 mm.

The fixing members 200*a* and 200*b* may include a porous structure. In a case in which the fixing members include a porous structure, since the electrolyte may be impregnated into the electrode stack by passing through the fixing member, a reduction in the electrolyte impregnability of the electrode stack due to the fixing member may be prevented. Specifically, the fixing members 200*a* and 200*b* may be a finishing tape in which an adhesive layer is formed on one surface of a polymer base material layer having a porous structure, but are not limited thereto. The polymer material, for example, may be polyethylene terephthalate (PET), polyvinyl chloride (PVC), or polyethylene (PE), but is not limited thereto.

It is desirable that the fixing members 200*a* and 200*b* have a width in an overall width direction of the electrode stack of about 10 mm to 50 mm or about 20 mm to 40 mm. If the widths of the fixing members 200*a* and 200*b* are excessively large, since an outer surface area of the electrode stack 100, which is covered by the fixing members 200*a* and 200*b*, is increased to decrease a contact area with the electrolyte, the electrolyte impregnability may be reduced. If the widths of the fixing members 200*a* and 200*b* are excessively small, an effect of fixing the electrode stack may be reduced.

The electrode assembly according to the present invention may include 2 to 10 fixing members, preferably 2 to 8 fixing members, and more preferably 3 to 7 fixing members. In this case, the fixing members may be arranged at horizontally symmetrical positions in the overall length direction, and preferably, the fixing members may be arranged apart from each other at equal intervals. In a case in which a plurality of fixed members are included and arranged as described above, an electrode stack having a long-cell structure with a large length may be firmly fixed, and variation of the pressure depending on a position of the electrode stack may be prevented.

Next, a lithium secondary battery according to the present invention will be described.

The lithium secondary battery according to the present invention includes the electrode assembly according to the present invention; an electrolyte; and a battery case accommodating the electrode assembly and the electrolyte. Since the electrode assembly has been described above, only the remaining components will be described below.

The lithium secondary battery according to the present invention may be prepared by a method of accommodating the electrode assembly in the battery case, then injecting the electrolyte, and sealing the battery case.

In this case, the battery case, for example, may be a pouch type battery case.

The pouch type battery case may include a barrier layer, a base material layer disposed on one surface of the barrier layer, a sealant layer disposed on another surface of the barrier layer, and at least one cup portion recessed in one direction.

Specifically, the pouch type battery case may be prepared by a method of forming a cup portion having a shape recessed in one direction by inserting a pouch film laminate having flexibility, in which a base material layer, a barrier layer, and a sealant layer are sequentially laminated, into a press-forming device, and drawing the pouch film laminate by applying pressure to a partial region of the pouch film laminate with a punch.

In this case, the base material layer is disposed as an outermost layer of the pouch type battery case to protect the electrode assembly from external impact and electrically insulate the electrode assembly.

The base material layer may be formed of a polymer material, and, for example, may be formed of at least one polymer material selected from the group consisting of polyethylene, polypropylene, polycarbonate, polyethylene terephthalate, polyvinyl chloride, acrylic polymer, polyacrylonitrile, polyimide, polyamide, cellulose, aramid, Nylon, polyester, polyparaphenylene benzobisoxazole, polyarylate, and Teflon.

The base material layer may have a single-layer structure or may have a multi-layer structure in which different polymer films are laminated. In a case in which the base material layer has a multi-layer structure, an adhesive layer may be disposed between the polymer films.

For example, the base material layer may have a laminated structure of a polyethylene terephthalate (PET) film and a Nylon film. In this case, it is desirable that the Nylon film is disposed on a barrier layer side, i.e., an inner side, and the polyethylene terephthalate film is disposed on a surface side of a pouch.

Since polyethylene terephthalate has excellent durability and electrical insulation properties, durability and insulation properties are excellent when the PET film is disposed on the surface side. However, with respect to the PET film, since adhesiveness to an aluminum alloy thin film constituting the barrier layer is weak and stretching behavior is also different, delamination between the base material layer and the barrier layer may occur during a forming process and a problem may occur in which the barrier layer may not be stretched uniformly to reduce formability, when the PET film is disposed on the barrier layer side. In contrast, since the Nylon film has a similar stretching behavior to the aluminum alloy thin film constituting the barrier layer, an effect of improving the formability may be obtained when the Nylon film is disposed between the polyethylene terephthalate and the barrier layer.

The polyethylene terephthalate film may have a thickness of 5 μm to 20 μm, preferably 5 μm to 15 μm, and more preferably 7 μm to 15 μm, and the Nylon film may have a thickness of 10 μm to 40 μm, preferably 10 μm to 35 μm, and more preferably 15 μm to 25 μm. When the thicknesses of the polyethylene terephthalate film and the Nylon film satisfy the above ranges, the formability and stiffness after forming are excellent.

The base material layer may have a total thickness of 10 μm to 60 μm, preferably 20 μm to 50 μm, and more preferably 30 μm to 50 μm. In a case in which the base material layer has the multi-layer structure, the thickness is a thickness including the adhesive layer. When the base material layer satisfies the above range, durability, insulation properties, and formability are excellent. If the base material layer is excessively thin, the durability may be reduced and the base material layer may be damaged during the forming process, and, if the base material layer is excessively thick, the formability may be reduced, a total thickness of the pouch may be increased, and a battery accommodation space may be decreased to reduce energy density.

The barrier layer is for securing mechanical strength of the pouch type battery case, blocking incoming and outgoing of gas or moisture from the outside of the secondary battery, and preventing leakage of the electrolyte.

The barrier layer may be formed of a metallic material, and, for example, may be formed of an aluminum alloy thin film. In this case, the aluminum alloy thin film may include aluminum and a metal element other than the aluminum, for example, at least one selected from the group consisting of iron (Fe), copper (Cu), chromium (Cr), manganese (Mn), nickel (Ni), magnesium (Mg), silicon (Si), and zinc (Zn).

The barrier layer may have a thickness of 40 μm to 100 μm, more preferably 50 μm to 80 μm, and more preferably 60 μm to 80 μm. In a case in which the thickness of the barrier layer satisfies the above range, the formability is improved to increase a forming depth of the cup portion, or occurrence of cracks and/or pinholes is reduced even when forming two cups so that resistance to external stress after forming is improved.

The sealant layer is bonded through thermocompression to seal the pouch type battery case, wherein it is disposed on an inner layer of the battery case.

Since the sealant layer is a surface in contact with the electrolyte and the electrode assembly after the pouch is formed, it must have insulation properties and corrosion resistance, and, since the sealant layer must completely seal the inside to block material movement between the inside and the outside, it must have high sealing properties.

The sealant layer may be formed of a polymer material, and, for example, may be formed of at least one selected from the group consisting of polyethylene, polypropylene, polycarbonate, polyethylene terephthalate, polyvinyl chloride, acrylic polymer, polyacrylonitrile, polyimide, polyamide, cellulose, aramid, Nylon, polyester, polyparaphenylene benzobisoxazole, polyarylate, and Teflon. It is particularly preferable to include polypropylene (PP) which has excellent mechanical properties, such as tensile strength, stiffness, surface hardness, wear resistance, and heat resistance, and chemical properties such as corrosion resistance.

More specifically, the sealant layer may include polypropylene, cast polypropylene (CPP), acid modified polypropylene, a polypropylene-butylene-ethylene copolymer, or a combination thereof.

The sealant layer may have a single-layer structure or may have a multi-layer structure including two or more layers formed of different polymer materials.

The sealant layer may have a total thickness of 60 μm to 100 μm, preferably 60 μm to 90 μm, and more preferably 70 μm to 90 μm. If the thickness of the sealant layer is excessively thin, sealing durability and insulation properties may be reduced, and if the thickness of the sealant layer is excessively thick, since flexibility may be reduced and a total thickness of the pouch film laminate may be increased, volumetric energy density may be reduced.

The electrolyte is for moving lithium ions generated by an electrochemical reaction of the electrode during charge and discharge of the secondary battery, wherein various electrolytes for a lithium secondary battery, which are known in the art, may be used, and types thereof are not particularly limited.

For example, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methyl ethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent is preferable, and a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) is more preferable.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 5.0 M, preferably 0.1 M to 3.0 M. If the concentration of the lithium salt is included within the above range, since the electrolyte may have appropriate conductivity and viscosity, excellent performance of the electrolyte may be obtained, and lithium ions may effectively move.

In order to improve life characteristics of the battery, suppress a reduction in battery capacity, and improve discharge capacity of the battery, an additive may be further included in the electrolyte in addition to the electrolyte components.

Hereinafter, the present invention will be described in more detail, according to specific examples.

EXAMPLES

A positive electrode with a size of 70 mm×500 mm, a negative electrode with a size of 75 mm×505 mm, and a separator with a size of 80 mm×510 mm were prepared and stacked in the order of the positive electrode/the separator/the negative electrode, to form an electrode stack.

In this case, the positive electrode was prepared by coating both surfaces of an aluminum current collector having a thickness of 12 μm and a length of 500 mm with a positive electrode slurry such that a total length of a positive electrode active material layer was 490 mm, and then drying and rolling the coated aluminum current collector. Positive electrode sliding portions with a length of 8 mm were formed at both end portions of the positive electrode active material layer, and a total thickness of the positive electrode was 162 μm.

Also, the negative electrode was prepared by coating both surfaces of a copper current collector having a thickness of 8 μm and a length of 505 mm with a negative electrode slurry such that a total length of a negative electrode active material layer was 495 mm, and then drying and rolling the coated copper current collector, and negative electrode sliding portions with a length of 10 mm were formed at both end portions of the negative electrode active material layer, and a total thickness of the negative electrode was 215 μm.

Next, two first fixing members and four second fixing members were wound around an outer surface of the electrode stack in an overall width direction to prepare an electrode assembly. In this case, both ends of the first fixing member were arranged to be located 5 mm away from both end portions of the electrode stack, and the second fixing members were arranged at equal intervals between the first fixing members. A finishing tape (PET, Daehyun ST) with a width of 30 mm and a thickness of 47 μm was used as the first fixing member, and a finishing tape (PET, Daehyun ST) with a width of 30 mm and a thickness of 22 μm was used as the second fixing member.

Comparative Example 1

An electrode assembly was prepared in the same manner as in the Example except that the first fixing member was not used, and six second fixing members were wound around an outer surface of the electrode stack in an overall width direction to prepare the electrode assembly.

Comparative Example 2

An electrode assembly was prepared in the same manner as in the Example except that both ends of the first fixing member were arranged to be located 30 mm away from both end portions of the electrode stack, and three second fixing members were used.

Experimental Example 1

A lithium secondary battery cell was prepared by accommodating each of the electrode assemblies prepared in the example and the comparative examples in a pouch type battery case in which Nylon/polyethylene terephthalate/Al alloy thin film/polypropylene were sequentially laminated and a cup portion was formed, injecting an electrolyte solution, and then sealing the pouch type battery case.

Then, after a stack of four lithium secondary battery cells was defined as one set and a total of four sets were stacked on a polyurethane pad, a polyurethane pad was stacked as an uppermost layer to prepare a cell-pad assembly composed of 16 lithium secondary batteries and 5 polyurethane pads, and the cell-pad assembly was inserted into a module frame to prepare a module. After charging of the lithium secondary battery module at 0.33 C to 4.22 V and discharging of the lithium secondary battery module at 0.33 C to 2.5 V were set as one cycle and 800 cycles of the charging and discharging were repeated, the electrode stack was separated and visually confirmed whether or not lithium plating occurred.

Figure 3:
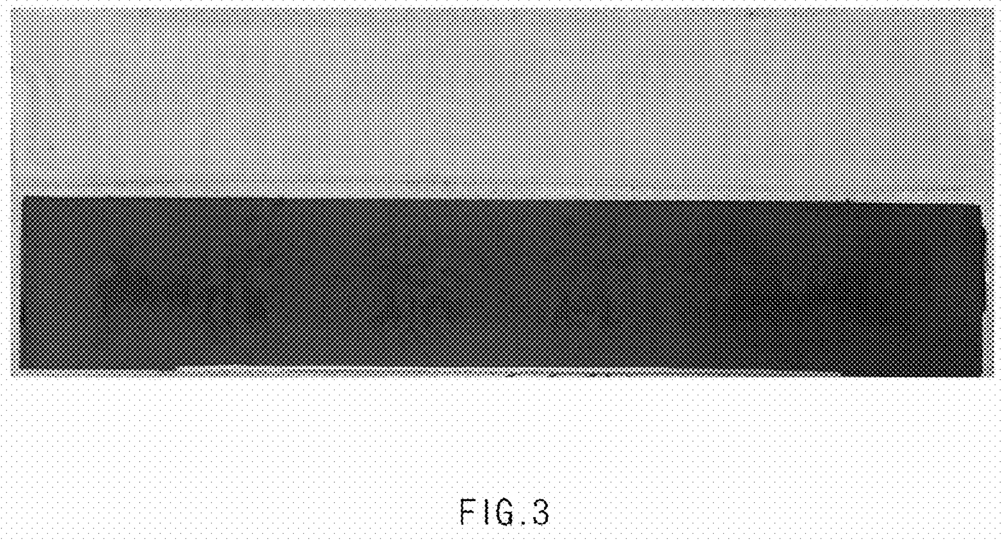
FIG. 3 is a photograph showing whether or not lithium plating occurs after 800 charge and discharge cycles of a module using an electrode assembly prepared in an Example.
Figure 4:
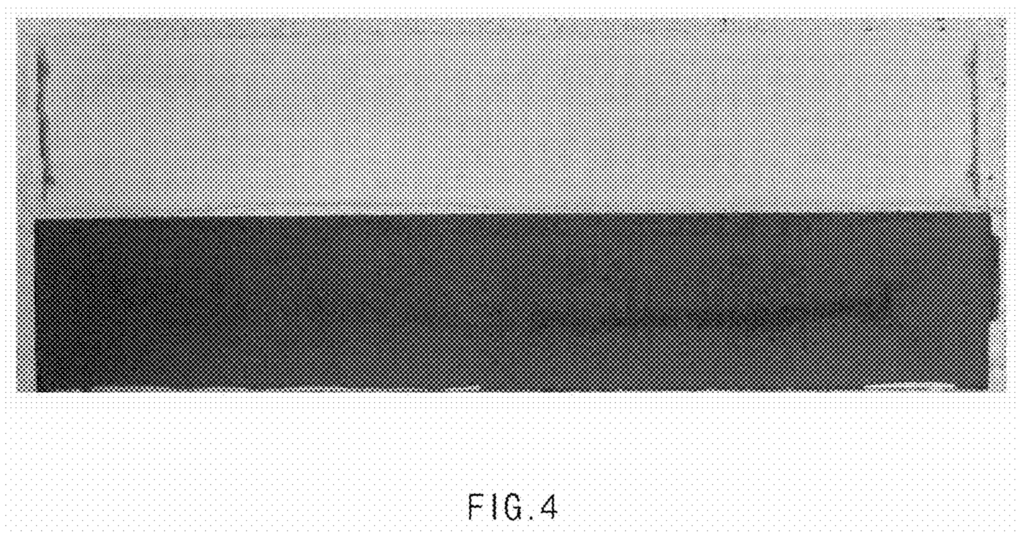
FIG. 4 is a photograph showing whether or not lithium plating occurs after 800 charge and discharge cycles of a module using an electrode assembly prepared in Comparative Example 1.
Figure 5:
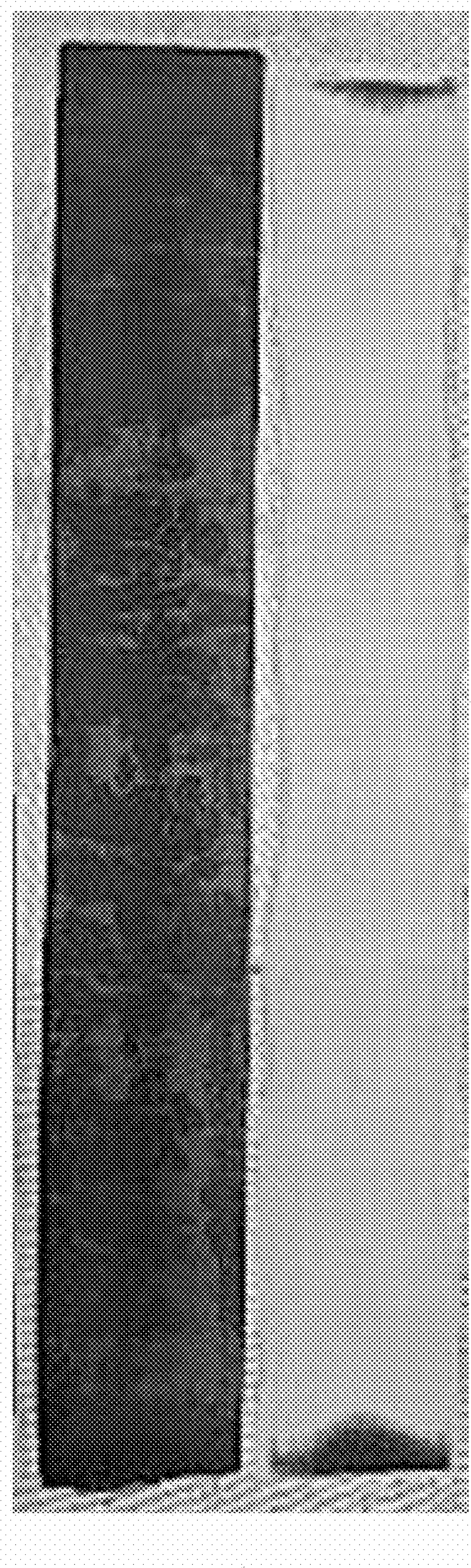
FIG. 5 is a photograph showing whether or not lithium plating occurs after 800 charge and discharge cycles of a module using an electrode assembly prepared in Comparative Example 2.

Measurement results are presented in Table 1 and FIGS. 3 to 5 below. A case where lithium plating was not observed visually was indicated as O, and a case where lithium plating was observed was indicated as X.

TABLE 1

| | Whether or not lithium plating occurred |
|---|---|
| Example | ○ |
| Comparative Example 1 | X |
| Comparative Example 2 | X |

According to Table 1, it may be confirmed that the lithium plating did not occur in the lithium secondary battery using the electrode assembly of Example, but the lithium plating occurred in the lithium secondary batteries using the electrode assemblies of Comparative Examples 1 and 2.

DESCRIPTION OF THE SYMBOLS

1: Electrode Assembly
10: Positive Electrode
20: Negative Electrode
30: Separator
100: Electrode Stack
200*a*: First Fixing Member
200*b*: Second Fixing Member
300: Electrolyte

The invention claimed is:

1. An electrode assembly comprising:
an electrode stack which comprises:
a positive electrode including a positive electrode active material layer;
a negative electrode including a negative electrode active material layer;
a separator disposed between the positive electrode and the negative electrode; and
at least one fixing member which fixes the electrode stack by winding the electrode stack in an overall width direction,
wherein the positive electrode comprises a positive electrode sliding portion in which a thickness of the positive electrode active material layer decreases,
the fixing member comprises a first fixing member overlapping the positive electrode sliding portion and a second fixing member not overlapping the positive electrode sliding portion, and
a thickness of the first fixing member is greater than a thickness of the second fixing member.

2. The electrode assembly of claim 1, wherein, when the thickness of the first fixing member is $T_1$, the thickness of the second fixing member is $T_2$, and a thickness of the positive electrode is $T_c$, the electrode assembly satisfies Equation 1:

$$0 < T_1 - T_2 \leq 0.5T_c \quad \text{Equation 1}$$

3. The electrode assembly of claim 1, wherein the negative electrode comprises a negative electrode sliding portion in which a thickness of the negative electrode active material layer decreases.

4. The electrode assembly of claim 3, wherein the first fixing member overlaps at least a portion of a region corresponding to the negative electrode sliding portion.

5. The electrode assembly of claim 1, wherein a ratio (L/W) of an overall length (L) to an overall width (W) of the electrode stack is 3 or more.

6. The electrode assembly of claim 1, wherein a ratio of an overall length (L) to an overall width (W) of the electrode stack is in a range of 3 to 7.

7. The electrode assembly of claim 1, wherein the electrode assembly comprises 2 to 10 fixing members, and
the fixing members are arranged at horizontally symmetrical positions in an overall length direction.

8. The electrode assembly of claim 7, wherein the electrode assembly comprises more than 2 fixing members, and the fixing members are arranged apart from each other at equal intervals.

9. The electrode assembly of claim 1, wherein the fixing member comprises a porous structure.

10. The electrode assembly of claim 1, wherein the fixing member is a tape in which an adhesive layer is formed on one surface of a base material having a porous structure.

11. The electrode assembly of claim 1, wherein the fixing member has a width of 10 mm to 50 mm.

12. A lithium secondary battery comprising the electrode assembly of claim 1; an electrolyte; and a battery case accommodating the electrode assembly and the electrolyte.

13. The lithium secondary battery of claim 12, wherein the battery case is a pouch battery case.

14. The electrode assembly of claim 1, wherein, when the thickness of the first fixing member is $T_1$, the thickness of the second fixing member is $T_2$, and a thickness of the positive electrode is $T_c$, the electrode assembly satisfies Equation 2:

$$0.01T_c \leq T_1 - T_2 \leq 0.5T_c. \quad \text{Equation 2}$$

15. The electrode assembly of claim 1, wherein the electrode stack has an overall width of 50 mm to 200 mm and may have an overall length of 200 mm to 1,000 mm.

16. The electrode assembly of claim 1, wherein the electrode assembly comprises 2 to 10 fixing members.

* * * * *